United States Patent
Kolavennu et al.

(10) Patent No.: US 9,577,291 B2
(45) Date of Patent: Feb. 21, 2017

(54) COORDINATED CONTROL OF ELECTRIC VEHICLE CHARGING AND HVAC

(75) Inventors: Soumitri N. Kolavennu, Blaine, MN (US); David R. Kaufman, Scottsdale, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 814 days.

(21) Appl. No.: 13/400,495

(22) Filed: Feb. 20, 2012

(65) Prior Publication Data

US 2012/0210733 A1  Aug. 23, 2012

Related U.S. Application Data

(60) Provisional application No. 61/445,376, filed on Feb. 22, 2011.

(51) Int. Cl.

| | |
|---|---|
| *F25B 27/00* | (2006.01) |
| *H01M 10/42* | (2006.01) |
| *B60H 1/00* | (2006.01) |
| *B60L 11/18* | (2006.01) |
| *G05D 23/19* | (2006.01) |
| *B60L 1/06* | (2006.01) |
| *H01M 10/44* | (2006.01) |

(52) U.S. Cl.
CPC ........ *H01M 10/42* (2013.01); *B60H 1/00278* (2013.01); *B60H 1/00392* (2013.01); *B60L 1/06* (2013.01); *B60L 11/1844* (2013.01); *G05D 23/19* (2013.01); *H01M 10/44* (2013.01); *Y02E 60/721* (2013.01); *Y02T 10/7005* (2013.01); *Y02T 10/7072* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC .. F25B 42/022; F25B 49/025; F25B 2700/15; B60L 11/1844
USPC .................................. 62/228.1, 230
See application file for complete search history.

(56) References Cited

U.S. PATENT DOCUMENTS

| | | | |
|---|---|---|---|
| 7,010,363 B2 * | 3/2006 | Donnelly et al. ............... 700/19 |
| 7,130,719 B2 * | 10/2006 | Ehlers et al. ................. 700/276 |
| 7,343,226 B2 | 3/2008 | Ehlers et al. | |
| 2003/0036810 A1 | 2/2003 | Petite | |
| 2008/0281663 A1 | 11/2008 | Hakim et al. | |
| 2010/0076615 A1 | 3/2010 | Daniel et al. | |
| 2010/0218027 A1 * | 8/2010 | Boss et al. .................... 713/340 |
| 2010/0235008 A1 | 9/2010 | Forbes, Jr. et al. | |
| 2010/0289451 A1 | 11/2010 | Tuffner et al. | |
| 2011/0109266 A1 | 5/2011 | Rossi | |

(Continued)

OTHER PUBLICATIONS

"European Application Serial No. 12156372.0, European Search Report mailed Jun. 29, 2012", 3 pgs.

(Continued)

*Primary Examiner* — Jonathan Bradford
*Assistant Examiner* — Elizabeth Martin
(74) *Attorney, Agent, or Firm* — Schwegman Lundberg & Woessner, P.A.

(57) ABSTRACT

A system and method include receiving a temperature signal from a temperature sensor, controlling operation of an air conditioner condenser, and controlling an electric vehicle charger to operate to charge an electric vehicle battery only when the air conditioner condenser is not running.

13 Claims, 4 Drawing Sheets

(56) References Cited

U.S. PATENT DOCUMENTS

2011/0133693 A1* 6/2011 Lowenthal et al. .......... 320/109
2012/0001487 A1* 1/2012 Pessina ......................... 307/31

OTHER PUBLICATIONS

"European Application Serial No. 12156372.0, Office Action mailed Aug. 30, 2012", 5 pgs.
"European Application Serial No. 12156372.0, Response filed Feb. 9, 2013 to Office Action mailed Aug. 30, 2012", 7 pgs.
"European Application Serial No. 12156372.0, Examination Notification Art. 94(3) mailed Aug. 26, 2014", 5 pgs.
"European Application Serial No. 12156372.0, Response filed Dec. 23, 2014 to Examination Notification Art. 94(3) mailed Aug. 26, 2014", 11 pgs.

* cited by examiner

COORDINATED CONTROL OF ELECTRIC VEHICLE CHARGING AND HVAC

RELATED APPLICATION

This application claims priority to U.S. Provisional Application No. 61/445,376 (entitled COORDINATED CONTROL OF ELECTRIC VEHICLE CHARGING AND HVAC, filed Feb. 22, 2011) which is incorporated herein by reference.

BACKGROUND

In recent years many plug-in electric vehicles have been introduced into the market. These electric vehicles can be either fully electric vehicles or hybrid electric vehicles. These vehicles run on electrical energy stored in a battery. Electric vehicle owners typically charge the battery in their homes and garages using a charging outlet connected to the main electrical supply from the utility to the home.

Electric vehicles draw a major amount of power from the power grid at around 7.2 KW and take about 6-8 hours to charge completely. The current draw for the chargers is about 30 Amps at 240 Volts. Such amounts of power draw create a heavy load on transformers and other electric power delivery grid infrastructure installed by utilities. Utilities typically install a single transformer for every 4-6 houses in a neighborhood. If two or more people in the houses connected to a transformer charge their electric vehicles at the same time, degradation or even failure of the transformer may occur. Failure or degradation of a transformer can result in loss of electricity for all the households. These failures will be even more pronounced in case of variable pricing for the electrical energy. When electricity prices go down based on the time of the day, for example at 9 PM, owners of electric vehicles may all want to start charging their vehicles at the same time to take advantage of the reduced price.

SUMMARY

A system and method include receiving a temperature signal from a temperature sensor, controlling operation of an air conditioner condenser, and controlling an electric vehicle charger to operate to charge an electric vehicle battery only when the air conditioner condenser is not running.

DETAILED DESCRIPTION

Figure 1:
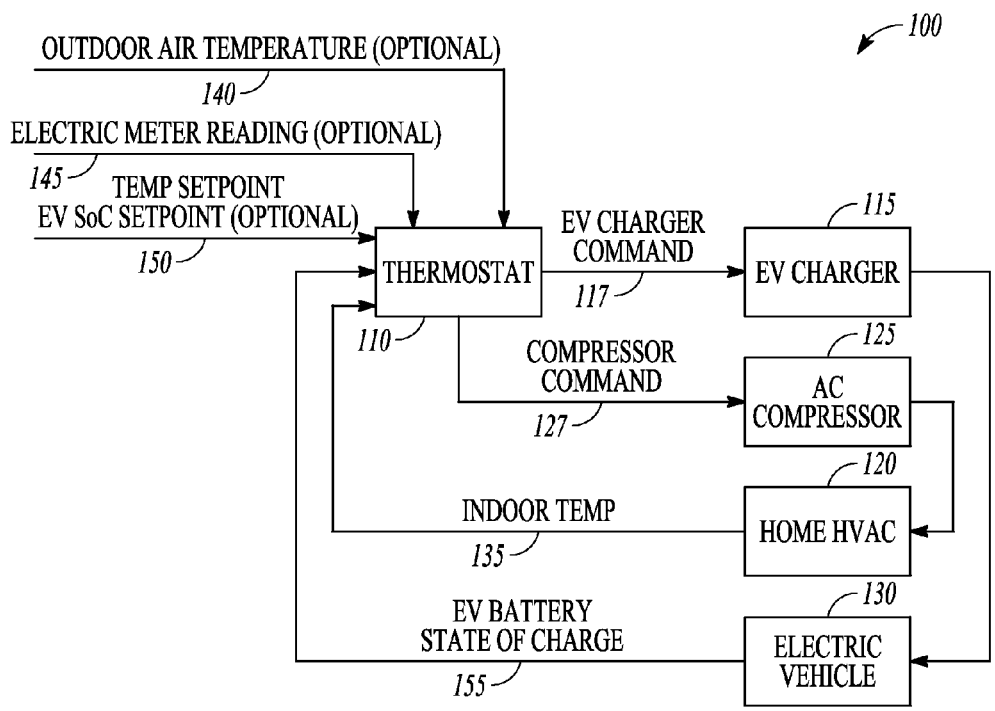
FIG. 1 is a block diagram of a system that integrates home heating, ventilation and air conditioning control with electric vehicle charging according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software stored on a storage device, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system regulates the amount of power drawn from the power grid by alternating the use of electric vehicle charging and air conditioning, specifically the air conditioner compressor. Many current households are equipped with thermostat controlled central air conditioners for temperature regulation in the house. The power draw rating for an air conditioner is about the same as the power draw being proposed for electric vehicles.

A typical air conditioner requires 30 Amps at 200-240 Volts in North America. This is the exact rating that is used by current electric vehicle chargers in the market. The electricity delivery infrastructure is well equipped to provide power when all air conditioners in a neighborhood or coupled to a single transformer are on. This is very typical of a hot summer afternoon. This fact is used to make sure that an electric vehicle and an air conditioner are not on at the same time, while still maintaining the comfort needs of the home owner.

Currently, a thermostat maintains the temperature in a house to a set point by controlling the air conditioner and the compressor of the air conditioner. In one embodiment, the control of the thermostat is extended to control an electric vehicle charger in addition to the air conditioner and furnace. Almost all electric vehicle chargers come with a communication protocol that allows remote controllability of the electric vehicle charging. The thermostat connects to the electric vehicle using the charger's communication protocol. A ZigBee smart energy profile is one popular such protocol. ZigBee is a specification for a suite of high level communication protocols using small, low-power digital transceivers based on IEEE 802.15.4. By placing the control functions in the thermostat, no additional utility infrastructure is needed. The thermostat may be used to maximize both comfort and convenience for a home owner.

FIG. 1 is a block diagram of a system 100 that integrates home heating, ventilation and air conditioning control with electric vehicle charging according to an example embodiment. A thermostat 110 is used to control both heating and cooling of a home and charging of an electric vehicle using a control algorithm embedded in the thermostat. The thermostat 110 communicates with an electric vehicle charging station 115 via a control command signal 117 as well as heating, ventilation and air conditioning (HVAC) equipment 120. The thermostat 110 includes a controller that has two main parameters that it uses to coordinate the temperature control and electric vehicle charging in the house—an air conditioner compressor 125 duty cycle via a control command signal 127 and a temperature control dead band.

The air conditioner compressor 125 duty cycle is a parameter that specifies the percentage of time the compressor 125 can be turned on. By decreasing a duty cycle value the thermostat 110 may use the remaining time of the duty cycle to allow for charging the electric vehicle 130 via the charger 115. Compressor duty cycling is already used by utilities for demand response. In some embodiments, the thermostat uses the duty cycling to allow for electric vehicle charging. This may be done by turning on the electric vehicle charger 115 when the compressor 125 is off, and turning off the charger 115 when the compressor 125 is on so that both do not run at the same time.

In a further embodiment, the thermostat may increase the dead band for temperature control. The dead band control is used to prevent the compressor from rapidly turning on and off when the indoor temperature is very close to the set point. Indoor temperature may be provided on line 135 either from a separate temperature sensor associated with the HVAC 120, a separate temperature sensor, or a temperature sensor integrated with thermostat 110.

Typically the dead band used is about plus or minus 1 to 0.5 degrees. For example, if the temperature set point is 72 degrees the current indoor temperature is 74 and the dead band is 1 degree, the thermostat switches on the air conditioner compressor to cool the house and keeps the compressor on until the temperature reaches 71 (set point–dead band) them the compressor is turned off. The compressor is not turned on until the temperature reaches 73 degrees (set point+dead band). In one embodiment, the compressor cycle is further increased by increasing the width of the dead band. Moreover the dead band width may be increased in an asymmetric fashion i.e. the lower limit may be much closer to the set point whereas the upper limit may be much further than the set point. In the previous example the set point may be at 72 degrees, the upper limit of the dead band may be set at 74, and the lower limit at 71. In some embodiments, set point and dead band limits may be set by the user.

Optionally the thermostat may also obtain information from an outdoor air sensor on line 140 to and for confirmation purposes may also communicate with the electric meter 145 in the house to make sure that the charger is responding to thermostat generated control signals.

System 100 integrates home heating, ventilation and air conditioning control with electric vehicle charging according to an example embodiment. The thermostat receives a temperature set point as indicated at 150, an indoor temperature 135 and an electric vehicle battery state of charge signal 155 from the electric vehicle 130. It may optionally receive outdoor air temperature 140, electric meter readings 145, and an electric vehicle set point 150. Using the received information, the thermostat controls both the electric vehicle charger 115 and the air conditioning compressor 125 to operate at desired times as described above. In some embodiments, the outdoor temperature 140 may be used to vary the set point limits 150 for dead band control, and also to modify the duty cycle. For instance, lower outdoor temperatures 140 may be used to anticipate a lower demand for air conditioning, allowing more time to charge the electric vehicle battery.

Figure 2:
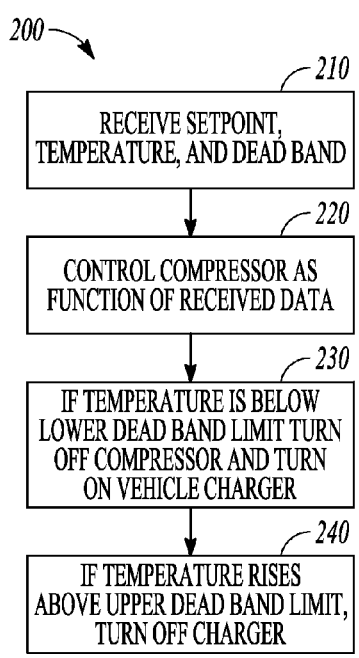
FIG. 2 is a flowchart illustrating a method of charging an electric vehicle according to an example embodiment.

FIG. 2 is a flowchart illustrating a method 200 of charging an electric vehicle according to an example embodiment. At 210, a thermostat receives a set point temperature for a house, an indoor temperature, and dead band limits. At 220, the thermostat is programmed to control an air conditioning compressor as a function of the set point temperature for the house, the indoor temperature, and the dead band limits. If the temperature is below a lower dead band limit, the air conditioner compressor is turned off, and if an electric vehicle battery needs charging, power is supplied to an electric vehicle charger as indicated at 230. If the temperature rises above an upper dead band limit, the charger is turned off at 240, and control returns to 220, where the compressor is controlled as a function of the received data. In various embodiments, the data, such as set point and dead band may be changed. The changed data will propagate to the control functions of the thermostat as changed, modifying the control as desired by a person in the home. The temperature continues to be monitored by the thermostat and steps 220, 230, and 240 are repeated as long as the thermostat is set to an air conditioning mode.

Figure 3A:
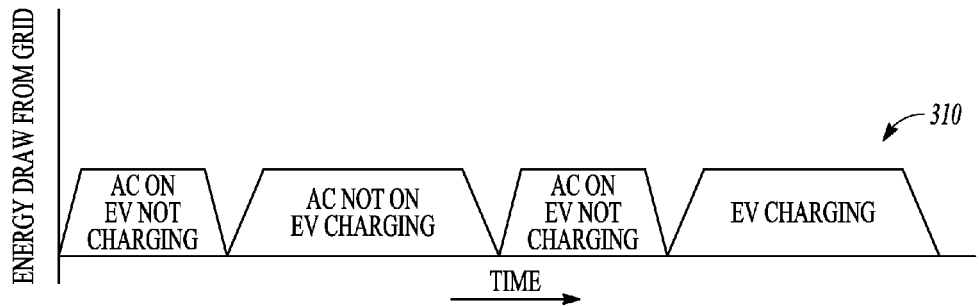
FIGS. 3A, 3B, and 3C are timing diagrams illustrating measured parameters over time according to an example embodiment.
Figure 3B:
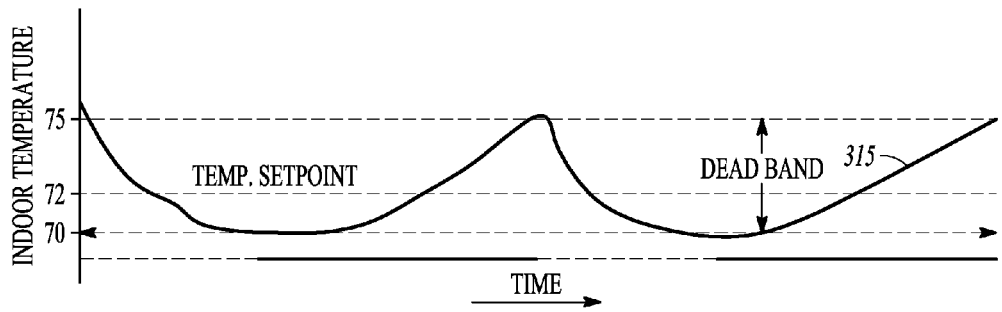
Figure 3C:
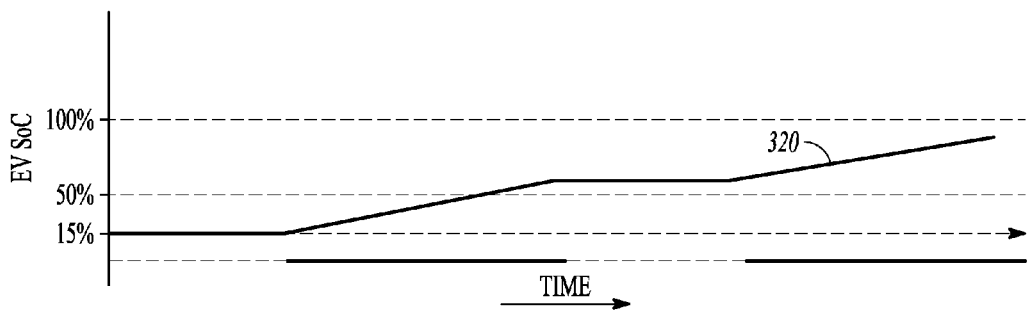

FIGS. 3A, 3B, and 3C are timing diagrams illustrating measured parameters over time according to an example embodiment. The top chart 310 illustrates whether the air conditioner condenser or the electric vehicle charger is running over time. In one embodiment, one of them is on while the other is off provided the battery needs charging. In some embodiments, whether or not the battery needs charging may be used to automatically switch between different set points and dead band limits. For instance, if the battery is fully charged, the set points and dead band limits may be set to a more comfortable setting as determined by a user.

In one embodiment, the air conditioner duty cycle is decreased when the electric vehicle battery needs charging. The air conditioner condenser dead band is then increased when the electric vehicle battery needs charging.

The same time scale is used to illustrate the indoor temperature at 315 with regard to the temperature set point and dead band limits. As can be seen, once the upper dead band limit of 75 is reached, the condenser is turned on until the temperature reaches the lower dead band limit of 70. Following that, the battery is charged. Two cycles of measured temperature between the dead band limits are illustrated.

The third graph illustrates the status of the electric vehicle battery charge at 320. It is seen as increasing in charge during each period of charging, and staying constant while the condenser is running.

Figure 4:
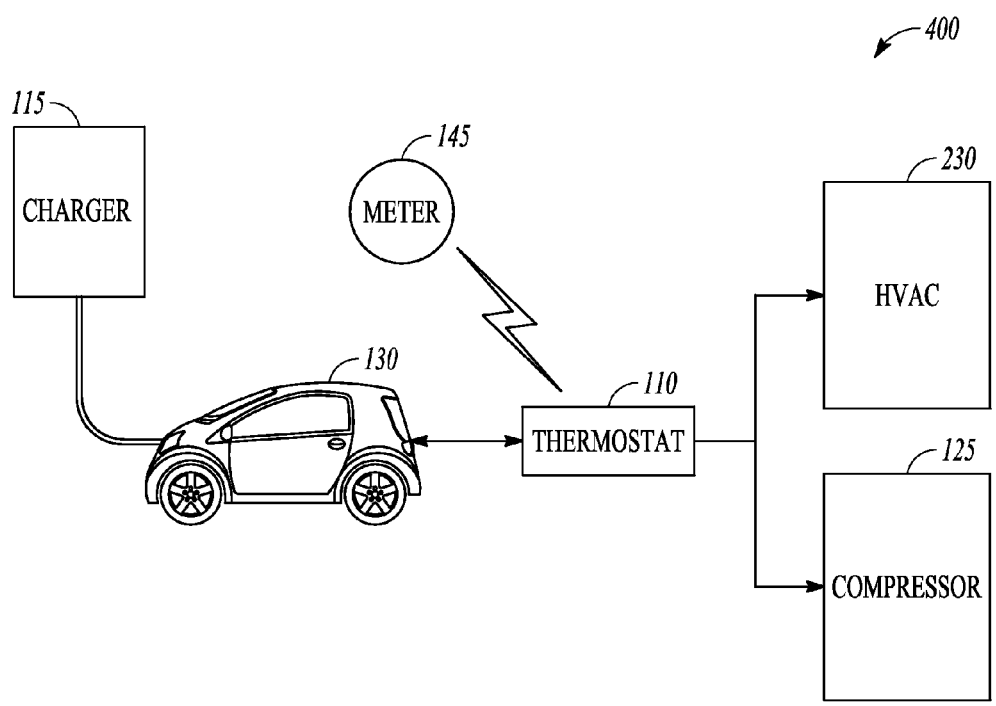
FIG. 4 illustrates a graphical depiction of the system of FIG. 1.

FIG. 4 illustrates a graphical depiction 400 of the system of FIG. 1, showing that the thermostat 110 acts as a controller for both the heating, ventilation and air conditioning equipment 120, 125 and for the electric vehicle 130 charging. In some embodiments, signals between the components may be communicated via hard wired connections or wireless connections.

Figure 5:
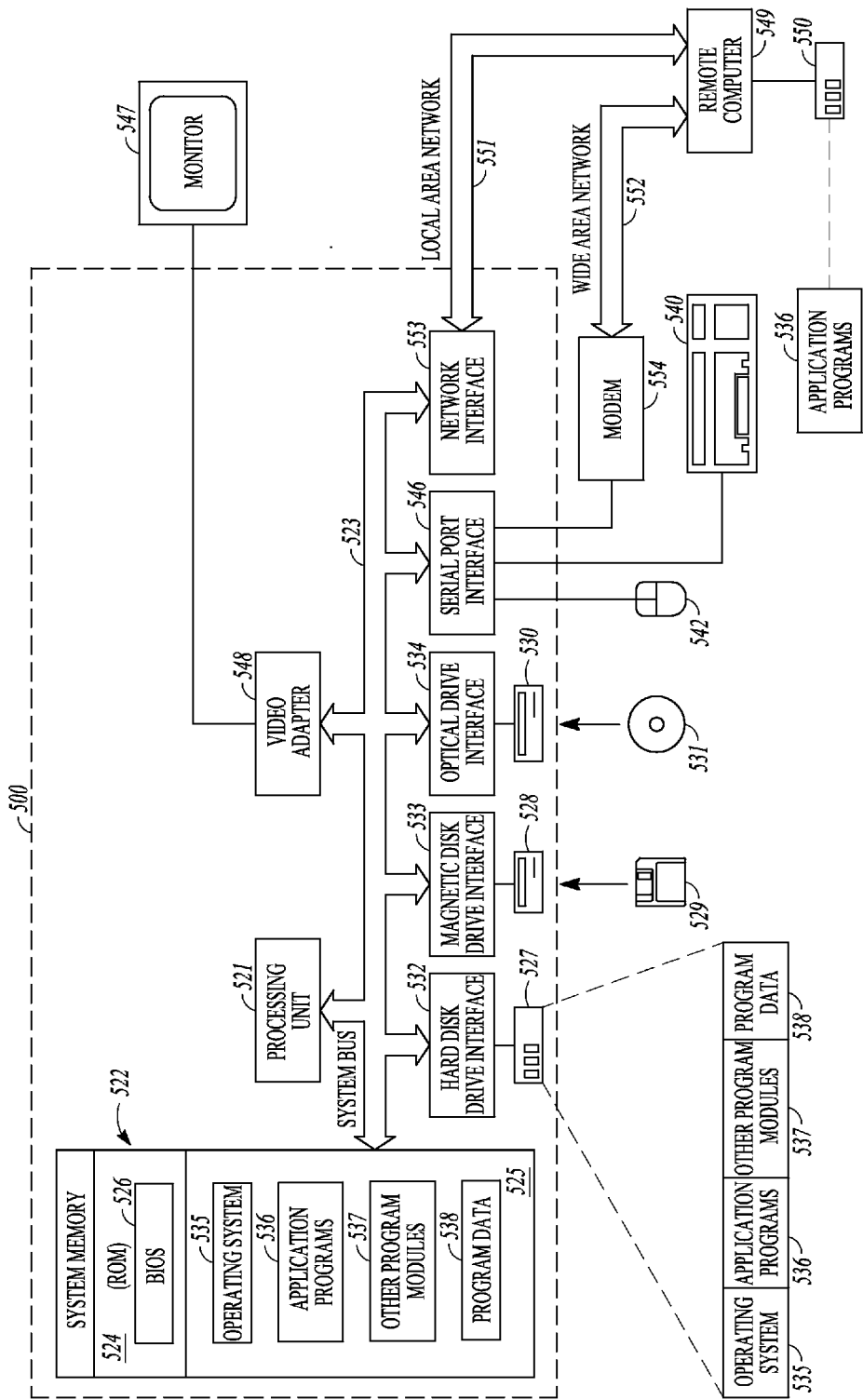
FIG. 5 is a block diagram of a computer system for performing control functions according to an example embodiment.

FIG. 5 is a block diagram of a computer system to implement methods according to an example embodiment. In the embodiment shown in FIG. 5, a hardware and operating environment is provided that is applicable to processing components in the thermostat controller and functions it implements. More components are shown than may be needed in some embodiments.

As shown in FIG. 5, one embodiment of the hardware and operating environment includes a general purpose computing device in the form of a computer 500 (e.g., a personal computer, workstation, or server), including one or more processing units 521, a system memory 522, and a system bus 523 that operatively couples various system components including the system memory 522 to the processing unit 521. There may be only one or there may be more than one processing unit 521, such that the processor of computer 500 comprises a single central-processing unit (CPU), or a plurality of processing units, commonly referred to as a multiprocessor or parallel-processor environment. In various embodiments, computer 500 is a conventional computer, a distributed computer, or any other type of computer.

The system bus 523 can be any of several types of bus structures including a memory bus or memory controller, a peripheral bus, and a local bus using any of a variety of bus architectures. The system memory can also be referred to as simply the memory, and, in some embodiments, includes read-only memory (ROM) 524 and random-access memory (RAM) 525. A basic input/output system (BIOS) program 526, containing the basic routines that help to transfer information between elements within the computer 500, such as during start-up, may be stored in ROM 524. The computer 500 further includes a hard disk drive 527 for reading from and writing to a hard disk, not shown, a magnetic disk drive 528 for reading from or writing to a removable magnetic disk 529, and an optical disk drive 530 for reading from or writing to a removable optical disk 531 such as a CD ROM or other optical media.

The hard disk drive 527, magnetic disk drive 528, and optical disk drive 530 couple with a hard disk drive interface 532, a magnetic disk drive interface 533, and an optical disk drive interface 534, respectively. The drives and their associated computer-readable media provide non volatile storage of computer-readable instructions, data structures, program modules and other data for the computer 500. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 529, optical disk 531, ROM 524, or RAM 525, including an operating system 535, one or more application programs 536, other program modules 537, and program data 538. Programming for implementing one or more processes or method described herein may be resident on any one or number of these computer-readable media.

A user may enter commands and information into computer 500 through input devices such as a keyboard, key pad, touch screen 540 and pointing device 542. Other input devices (not shown) can include a microphone, joystick, game pad, satellite dish, scanner, or the like. These other input devices are often connected to the processing unit 521 through a serial port interface 546 that is coupled to the system bus 523, but can be connected by other interfaces, such as a parallel port, game port, or a universal serial bus (USB). A monitor 547 or other type of display device can also be connected to the system bus 523 via an interface, such as a video adapter 548. The monitor 547 can display a graphical user interface for the user. In addition to the monitor 547, computers typically include other peripheral output devices (not shown), such as speakers and printers.

The computer 500 may operate in a networked environment using logical connections to one or more remote computers or servers, such as remote computer 549. These logical connections are achieved by a communication device coupled to or a part of the computer 500; the invention is not limited to a particular type of communications device. The remote computer 549 can be another computer, a server, a router, a network PC, a client, a peer device or other common network node, and typically includes many or all of the elements described above I/O relative to the computer 500, although only a memory storage device 550 has been illustrated. The logical connections depicted in FIG. 5 include a local area network (LAN) 551 and/or a wide area network (WAN) 552. Such networking environments are commonplace in office networks, enterprise-wide computer networks, intranets and the internet, which are all types of networks.

When used in a LAN-networking environment, the computer 500 is connected to the LAN 551 through a network interface or adapter 553, which is one type of communications device. In some embodiments, when used in a WAN-networking environment, the computer 500 typically includes a modem 554 (another type of communications device) or any other type of communications device, e.g., a wireless transceiver, for establishing communications over the wide-area network 552, such as the internet. The modem 554, which may be internal or external, is connected to the system bus 523 via the serial port interface 546. In a networked environment, program modules depicted relative to the computer 500 can be stored in the remote memory storage device 550 of remote computer, or server 549. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

EXAMPLES

1. An example system comprising:
an input to receive indoor temperature measurements;
an air conditioner control output to couple to an air conditioner to provide control signals to the air conditioner;
an electric vehicle battery charger output to couple to an electrical vehicle battery charger to provide control signals to the electric vehicle battery charger; and
a controller to receive the input and provide the control signals on the outputs to ensure either the air conditioner or the electric vehicle battery charger is operating at a given time.

2. The system of example 1 wherein the controller is a thermostat that selects either the air conditioner or the electric vehicle to run as a function of an air conditioner compressor duty cycle.

3. The system of example 1 or 2 wherein the controller is a thermostat that selects either the air conditioner or the electric vehicle to run as a function of an air conditioner dead band control.

4. The system of example 3 wherein the dead band control has a lower limit and an upper limit around a set point, and wherein the electric vehicle charger is turned off when the upper limit is reached.

5. The system of example 4 wherein the electric vehicle charger is turned on when the lower limit is reached.

6. The system of any one of examples 1-5 and further comprising an input to receive a battery charge signal.

7. The system of any one of examples 1-6 and further comprising an input to receive a signal representing power drawn from the grid.

8. A example method comprising:
receiving a temperature signal from a temperature sensor;
controlling operation of an air conditioner condenser; and controlling an electric vehicle charger to operate to charge an electric vehicle battery only when the air conditioner condenser is not running.

9. The method of example 8 wherein the air conditioner condenser is controlled in accordance with a duty cycle, and wherein the duty cycle is decreased when the electric vehicle battery needs charging.

10. The method of example 8 or 9 wherein the air conditioner condenser is controlled in accordance with a set point and dead band, and wherein the dead band is increased when the electric vehicle battery needs charging.

11. The method of example 10 wherein the air conditioner condenser is controlled in accordance with a duty cycle, and wherein the duty cycle is also decreased when the electric vehicle battery needs charging.

12. The method of any one of examples 8-11 wherein the controller selects either the air conditioner or the electric vehicle to run as a function of an air conditioner compressor duty cycle.

13. The method of any one of examples 8-12 wherein the controller selects either the air conditioner or the electric vehicle to run as a function of an air conditioner dead band control.

14. The method of example 13 wherein the dead band control has a lower limit and an upper limit around a set point, and wherein the electric vehicle charger is turned off when the upper limit is reached.

15. The method of example 14 wherein the electric vehicle charger is turned on when the lower limit is reached.

16. The method of any one of examples 8-15 and further comprising an input to receive a battery charge signal.

17. The method of any one of examples 8-16 and further comprising an input to receive a signal representing power drawn from the grid.

18. An example computer readable storage device having instructions stored thereon to cause a computer to perform a method, the method comprising:
receiving a temperature signal from a temperature sensor;
controlling operation of an air conditioner condenser; and
controlling an electric vehicle charger to operate to charge an electric vehicle battery only when the air conditioner condenser is not running.

19. The computer readable storage device of example 18 wherein the air conditioner condenser is controlled in accordance with a duty cycle, and wherein the duty cycle is decreased when the electric vehicle battery needs charging.

20. The computer readable storage device of example 18 or 19 wherein the air conditioner condenser is controlled in accordance with a set point and dead band, and wherein the dead band is increased when the electric vehicle battery needs charging.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A system comprising:
an input to receive indoor temperature measurements;
an air conditioner control output to couple to an air conditioner compressor to provide control signals to the air conditioner;
an electric vehicle battery charger output to couple to an electrical vehicle battery charger to provide control signals to the electric vehicle battery charger; and
a controller to receive the indoor temperature measurements and provide the control signals on the outputs to ensure the electric vehicle battery charger is operating only when the air conditioner compressor is not running, wherein the controller is a thermostat that selects either the air conditioner or the electric vehicle battery charger to run as a function of an air conditioner compressor duty cycle.

2. The system of claim 1 and further comprising an input to receive a battery charge signal.

3. The system of claim 1 and further comprising an input to receive a signal representing power drawn from the grid.

4. The system of claim 1 wherein the controller selects either the air conditioner or the electric vehicle battery charger to run as a function of an air conditioner dead band control, and wherein the controller widens the dead band responsive to a need to charge the battery.

5. The system of claim 1 wherein the controller selects either the air conditioner or the electric vehicle battery charger to run as a function of an air conditioner dead band control, and wherein the controller modifies a thermostat set point and the dead band responsive to battery charge.

6. The system of claim 1 wherein the controller selects either the air conditioner or the electric vehicle battery charger to run as a function of an air conditioner dead band control, and wherein the controller modifies the dead band responsive to outdoor temperature.

7. A system comprising:
an input to receive indoor temperature measurements;
an air conditioner control output to couple to an air conditioner compressor to provide control signals to the air conditioner;
an electric vehicle battery charger output to couple to an electrical vehicle battery charger to provide control signals to the electric vehicle battery charger; and
a controller to receive the indoor temperature measurements and provide the control signals on the outputs to ensure the electric vehicle battery charger is operating only when the air conditioner compressor is not running, wherein the controller is a thermostat that selects either the air conditioner or the electric vehicle battery charger to run as a function of an air conditioner dead band control, and wherein the controller adjusts the dead band as a function of battery charge.

8. The system of claim 7 wherein the dead band control has a lower limit and an upper limit around a set point, and wherein the electric vehicle battery charger is turned off when the upper limit is reached, and wherein at least one limit is adjustable by the controller as a function of outdoor temperature.

9. The system of claim 8 wherein the electric vehicle battery charger is turned on when the lower limit is reached.

10. A thermostat comprising:
an input to receive temperature measurements;
an air conditioner control output to couple to an air conditioner compressor to provide control signals to the air conditioner compressor;
an electric vehicle battery charger output to couple to an electrical vehicle battery charger to provide control signals to the electric vehicle battery charger;
an input to receive a battery charge state; and
a controller to receive the inputs and provide the control signals on the outputs to ensure that only the air conditioner compressor or the electric vehicle battery charger is operating at a given time, wherein the controller selects either the air conditioner or the electric vehicle battery charger to run as a function of an air conditioner dead band control and further modifies the air conditioner dead band based on detected charge state of the battery.

11. The system of claim 10 wherein the controller widens the dead band responsive to a need to charge the battery.

12. The system of claim 10 wherein the controller modifies a thermostat set point and the dead band responsive to battery charge.

13. The system of claim 10 wherein the controller modifies the hand responsive to outdoor temperature.

\* \* \* \* \*